United States Patent [19]

Maniawski et al.

[11] Patent Number: 5,663,566
[45] Date of Patent: Sep. 2, 1997

[54] NEGATIVITY BIAS REDUCTION

[75] Inventors: Piotr J. Maniawski, Mayfield Hts.; Stephen D. Miller, Chagrin Falls, both of Ohio

[73] Assignee: Picker International, Inc., Cleveland, Ohio

[21] Appl. No.: 633,206

[22] Filed: Apr. 16, 1996

[51] Int. Cl.$^6$ .................................................. G01T 1/20
[52] U.S. Cl. .............. 250/369; 250/363.04; 250/370.09; 378/901
[58] Field of Search ................... 250/363.09, 363.07, 250/369, 370.09; 364/413.16, 413.17, 413.21; 378/901

[56] References Cited

U.S. PATENT DOCUMENTS 5,416,815  5/1995  Hsieh ........................................ 378/4
5,461,655  10/1995  Vuylsteke et al. ........................ 378/62

OTHER PUBLICATIONS

"Reducing Negativity Artifacts in Emission Tomography: Post-Processing Filtered Backprojection Solutions", O'Sullivan, et al., IEEE Transactions on Medical Imaging, vol. 12, No. 4, Dec. 1993, pp. 653–663.

"Single Photon Emission Computed Tomography (SPECT) Principles and Instrumentation", Jaszczak, et al.; Investigative Radiology, Dec. 1985, vol. 20, pp. 897–910.

"Improved SPECT Quantification Using Compensation for Scattered Photons", Jaszczak, et al., J. Nucl. Medicine, vol. 25, No. 8, 1984, pp. 893–900.

"Local Geometry Variable Conductance Diffusion for Post-Reconstruction Filtering", Luo, et al., IEEE Transactions on Nuclear Science, vol. 41, No. 6, Dec. 1994, pp. 2800–2806.

"Window Selection for Dual Photopeak Window Scatter Correction in Tc–99m Imaging", de Vries, et al., IEEE Transactions on Nuclear Science, vol. 41, No. 6, Dec. 1994, pp. 2771–2778.

"Compton Scatter Compensation Using the Triple–Energy Window Method for Single–and Dual–Isotope SPECT", Ichihara, et al., J. Nucl Med 1993, vol. 34, No. 12, pp. 2216–2221.

"Difference Images Calculated from Ictal and Interictal Technetium–99m–HMPAO SPECT Scans of Epilepsy", Zubal, et al.; J. Nuc. Medicine, vol. 36, No. 4, Apr. 1995, pp. 684–689.

"Quantitative Planar Thallium–201 Stress Scintigraphy: A Critical Evaluation of the Method", Wackers, et. al., Semiars in Nuclear Medicine, vol. XV, No. 1, Jan. 1995, pp. 46–66.

"Rapid Radionuclide–Derived Systolic and Diastolic Cardiac Function Using Cycle–Dependent Background Correction and Fourier Analysis", Lee, et al., Section of Cardiology, Yale University, New Haven, CT. Jul. 1987.

*Primary Examiner*—David P. Porta
*Assistant Examiner*—David Vernon Bruce
*Attorney, Agent, or Firm*—Timothy B. Gurin; John J. Fry

[57] ABSTRACT

Radiation indicative of an object being imaged is detected and a data set indicative of the detected radiation is generated. Negative cells within the data set are located and ordered for processing. A negative cell is selected for processing. A mask region is defined in relation to the selected cell, and positive cells within the mask region are identified. A correction factor is determined, the value of the positive cells is adjusted accordingly. The value of the selected cell is also adjusted so that the count value of the data set remains constant. If the value of the selected cell is still negative, new correction factors are determined and the values of the positive cells and the selected cell are again adjusted. The process is repeated until all of the negative cells within the data set have been processed. An image indicative of the object is then generated.

26 Claims, 6 Drawing Sheets

Fig. 6

PRIOR TO DISTRIBUTION

| 1 | 10 | 15 |
|---|----|----|
| 1 | -15 | -2 |
| 2 | -5 | 0 |

$V_{SEL} = -10$
$N = 5$
$V_{SEL}/N = -3$

| $1^{-3}$ | $10^{-3}$ | $15$ |
|----------|-----------|------|
| $1^{-3}$ | -15 | -2 |
| $2^{-3}$ | -5 | 0 |

| -2 | 7 | 12 |
|----|---|----|
| -2 | 0 | -2 |
| -1 | -5 | 0 |

| $0^{-2}$ | 7 | 12 |
|----------|---|----|
| $0^{-2}$ | -5 | -2 |
| $0^{-1}$ | -5 | 0 |

AFTER FIRST DISTRIBUTION (ITERATION REQUIRED)

| 0 | 7 | 12 |
|---|---|----|
| 0 | -5 | -2 |
| 0 | -5 | 0 |

$V_{SEL} = -5$
$N = 2$
$V_{SEL}/N = -2.5$

| 0 | $7^{-2.5}$ | $12^{-2.5}$ |
|---|------------|-------------|
| 0 | -5 | -2 |
| 0 | -5 | 0 |

RESULT AFTER ITERATION

| 0 | 4.5 | 9.5 |
|---|-----|-----|
| 0 | 0 | -2 |
| 0 | -5 | 0 |

NEGATIVITY BIAS REDUCTION

BACKGROUND

The present invention finds particular application in conjunction with medical imaging, and especially in connection with gamma cameras and computed tomography equipment where it is necessary to account for negative data present in a positively constrained data set. It will be appreciated, however, that the invention will also have other applications.

Nuclear or gamma cameras are often used to measure gamma radiation emitted by a body under examination. One application of nuclear or gamma cameras is in medical imaging, where one or more radionuclides are introduced into a region of interest within a patient or other object being imaged. These radionuclides decay, thereby emitting gamma radiation characterized by photons having one or more characteristic energies.

By measuring the energy level and the location of the emitted photons, an image representative of the gamma radiation emitted from the body under examination can be created. Inasmuch as the image is based on a count of photons detected at each of a plurality of locations, each location is expected to have a non-negative value.

In practice, however, the radiation spectrum resulting from the decay of a radionuclide is spread over a range of energies. Compton interactions with electrons in the gamma camera scintillation crystal and the body being imaged contribute to this spread. Photons which experience Compton interactions are deflected in angle and experience an energy loss compared to primary (i.e. non-scattered) photons, but can be detected along with primary photons, thereby resulting in spurious scatter counts at energy levels below the primary photopeak.

Numerous techniques for correcting for Compton scatter have been implemented, for example, as described in Morgan, et al., U.S. application Ser. No. 08/561,936, Split Window Scatter Correction, filed Nov. 22, 1995, incorporated by reference herein. In general, these scatter correction techniques estimate the number of scatter counts at a given location and subtract the estimate from a total count value, thereby generating a corrected value. In some situations, a negative count value will be generated.

Various techniques for handling these negative counts have also been implemented. One technique is to truncate negative values to zero. Another technique is to add the largest negative magnitude to all of the elements in the data set, thus placing a zero at the location containing the most negative number. These techniques overestimate the number of counts that have been received, thereby biasing the resultant data set.

Yet another scheme is to apply a low pass filter to the data set. Because a low pass filter by definition decreases the rate of change of the data, edges and other features within the object being imaged are rendered less distinct. Thus, the application of a low pass filter also introduces unwanted errors.

Yet another technique for removing negativity artifacts in filtered back projection data sets was disclosed by O'Sullivan et at. in Reducing Negativity Artifacts in Emission Tomography: Post-Processing Filtered Backprojection Solutions, IEEE Transactions on Medical Imaging, Vol. 12, No. 4, December 1993. The disclosed technique involves scanning a post-processed image to locate a pixel having a negative value and locating the most positive pixel in the neighborhood of the pixel. The negative pixel is adjusted to the smaller of the sum of the pixels and zero. The positive pixel is adjusted to the larger of the sum of the pixels and zero. A new negative pixel is selected, and the process is repeated.

The disclosed thus distributes the negative artifact at a pixel in the surrounding neighborhood. By adjusting the value of the single most positive pixel, however, that pixel is likely to be over corrected, leading to inaccuracies in the corrected data set. The disclosed algorithm also fails to preserve the total number of counts where the most positive pixel in the neighborhood is not sufficiently positive to absorb the entire negative value of the located pixel.

In light of these shortcomings, a technique for handling negative data in a positively constrained data set which avoids the errors introduced by previous techniques is needed.

SUMMARY

In accordance with the present invention, radiation indicative of an object being imaged is detected and a data set indicative of the detected radiation is generated. A cell within the data set is selected, and a mask region is defined with respect to the selected cell. At least a portion of the value of the selected cell is distributed among one or more cells within the mask region, and an image indicative of the object is generated.

According to a first aspect of the invention, the selected cell has a negative value, and the value of each positive cell within the mask region is adjusted. The value of the selected cell is adjusted so that the sum of the values of the selected cell and the cells within the mask region is unchanged. The values of the positive cells within the mask region and the value of the selected cell may be adjusted repeatedly until the selected cell is no longer negative. The mask region may also be redefined prior to repeating the process.

According to another aspect of the invention, a cell within the data set is selected and a mask region defined. The values of at least one of the cells within the mask region and the value of selected cell are adjusted. The values are adjusted repeatedly until the selected cell reaches a desired value. The process may be repeated, with the cells within the data set being selected in a desired order.

According to another aspect of the invention, a cell within the data set which satisfies a first criterion is selected. A mask region is defined with respect to the selected cell. At least a portion of the value of the selected cell is distributed among the cells within the mask region having values which satisfy a second criterion. The process may be repeated until all cells having a value which satisfies the first criterion have been selected. According to more limited aspects, the first criterion is a value less than zero and the second criterion is a value greater than zero.

According to yet another aspect of the invention, a cell is selected, and a mask region is defined. Cells within the mask region which satisfy a desired criterion are identified, and a suitable correction factor is calculated. The value of each of the identified cells is adjusted by its respective correction factor.

In accordance with more limited aspects of the present invention, the cells may be selected in least first, most first, directional, and random orders. In accordance with other limited aspects of the present invention, correction factors for the value of cells within the mask region may be calculated on percentage, uniform, random, and distance bases. The cells within the mask region may be also be adjusted on percentage, uniform, random, and distance bases.

One advantage of the present invention is that it provides an accurate method of handling negative values in a positively constrained data set which avoids biasing of the data set while preserving data indicative of edges within the object being imaged. Another advantage of the present invention is that negative values may be distributed more uniformly in the neighborhood of a selected cell, hence increasing the accuracy of the corrected data set. Yet another advantage of the present invention is its computational efficiency.

Still further advantages of the present invention will become apparent to those of ordinary skill in the art upon reading and understanding the following detailed description of the preferred embodiments.

DRAWINGS

FIG. 6 depicts an arbitrary cell and mask region before and after correction on a uniform basis according to the present invention.

DESCRIPTION

Figure 1:
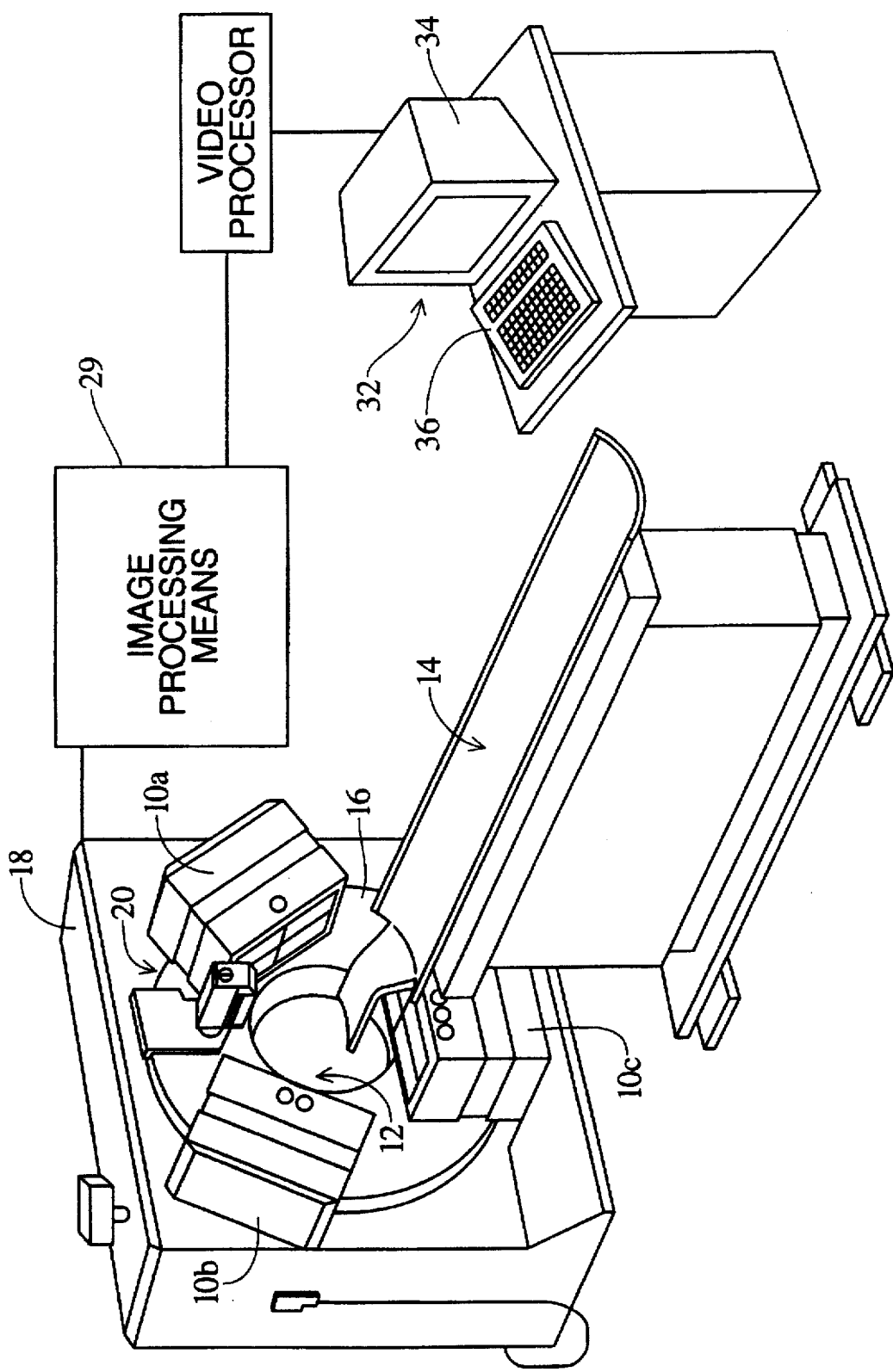
FIG. 1 is a SPECT camera according to the present invention.

With reference to FIG. 1, a SPECT camera assembly includes a plurality of gamma camera heads 10a, 10b, and 10c disposed equidistant around a subject examination region 12. A patient couch 14 or other subject support supports the subject within the examination region.

The gamma camera heads 10a, 10b, 10c are mounted to a rotatable gantry portion 16 which is connected to a suitable motor and bearing assembly supported by a stationary gantry portion 18. Also mounted to the rotating gantry 16 are a plurality of mechanical drives (not shown) which move each of the gamma camera heads 10a, 10b, 10c independently radially toward and away from the examination region 12. An image processing means 29 processes detected radiation to create a three dimensional image representation.

Figure 2:
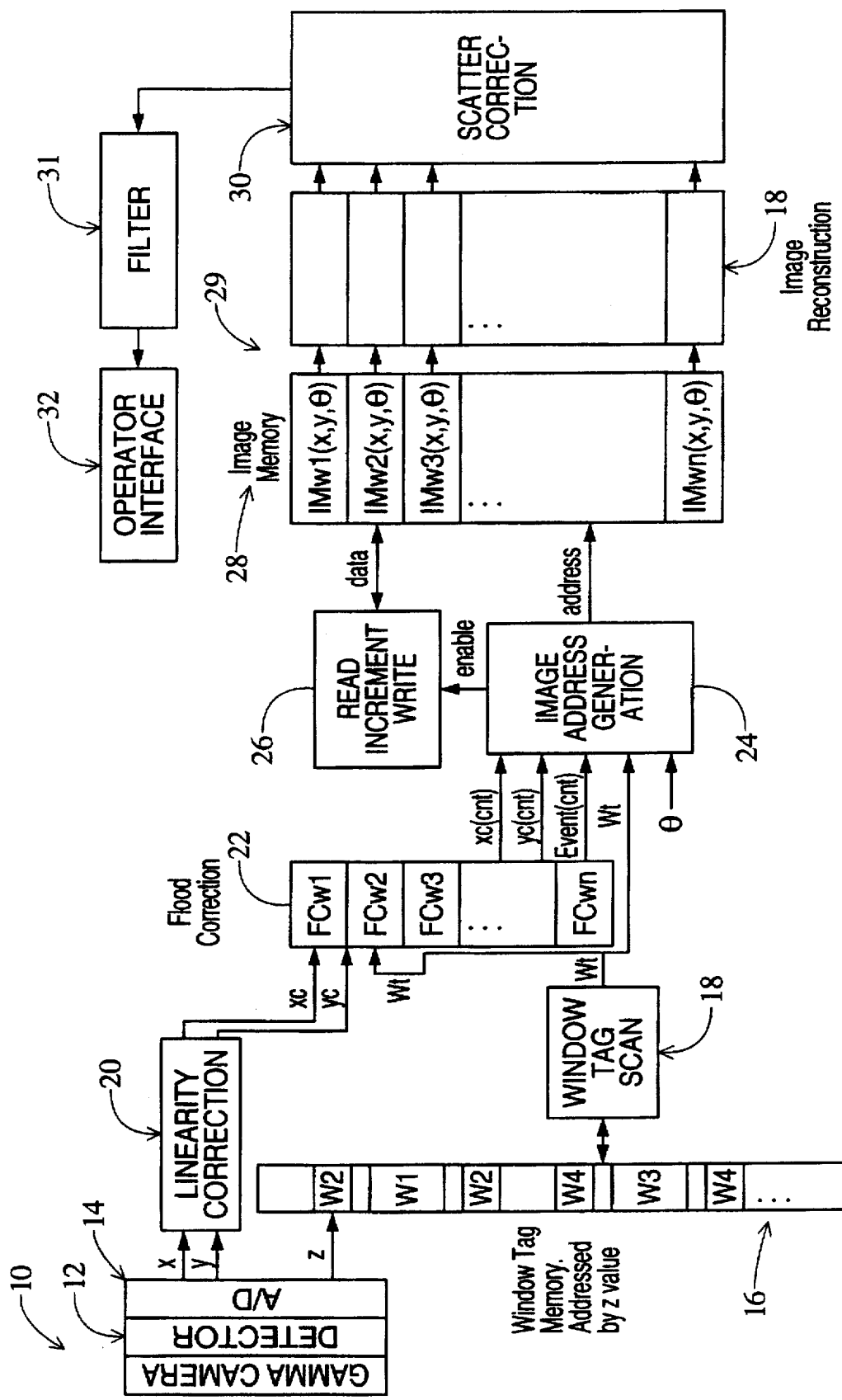
FIG. 2 is a block diagram of a gamma camera system according to the present invention.

With reference to FIG. 2, each gamma camera head 10 comprises a detector means 12 which generally includes a collimator, a NaI(T1) crystal, a plurality of photomultiplier tubes, and processing electronics. The gamma camera 10 further includes an analog to digital converter means 14, which produces digital outputs indicative of the x,y position and the energy level z of photons detected by the gamma camera 10. An encoder (not shown) indicates the angular orientation θ of the receiving detector head 10 around the examination region 12.

The energy level z, which corresponds to the energy of a detected photon, is used to classify the energy level z of a detected photon into one or more energy windows. A window detection circuit such as a window tag memory 16 defines energy windows designated W1, W2, ... Wn, each corresponding to one or more energy ranges as shown generally in FIG. 2.

The x,y coordinates of the detected event are corrected by a linearity correction means 20 which remaps the coordinates into corrected coordinates $x_c$, $y_c$ based on a predetermined calibration lookup table. Flood control means 22 corrects for location dependent non-uniformities in the sensitivity of detector 12 based on an a priori analysis of detector 12 characteristics. The flood correction means 22 may ignore an event, pass the event, or pass the event and add an additional event. If an event is added, the new event is added at a random location in the vicinity of the passed event. For each event passed by the flood correction means 22, corresponding position coordinates $x_c(cnt)$, $y_c(cnt)$ and an event count E(cnt) are generated.

The position coordinates, the corresponding window tag, and the angular orientation of the detector head are used by an image address generation means 24 to generates a unique memory address. In response to an event, a memory increment means 26 reads data from the corresponding address in the image memory 28, increments the data to reflect the new event count, and stores the incremented data in the corresponding address.

The image memory 28 thus contains a number of data sets Imwn(x,y,θ), each data set being associated with an energy range. For each energy range, a reconstruction processor 34 processes the data using an iterative reconstruction technique to create image representations corresponding to a plurality of generally parallel slices of the object being imaged. Of course, the invention is equally applicable to filtered back projection and other reconstruction techniques.

Based on the reconstructed images for the energy ranges which make up a given slice, a scatter correction means 30 then corrects for scattering radiation in the respective slices to produce corresponding corrected image representations. As well known to those in the art, scatter correction techniques generally involve the estimation of a scattering component and the correction of the total number of counts within the primary photopeak to obtain a corrected count value. In some cases, the scatter can be overestimated, thereby resulting in negative count values. Negative values are of course particularly undesirable in a positively constrained data set.

As described more fully below, a negativity bias reduction filter processes the output of the scatter correction means 30 on a slice by slice basis to correct for negative count values in the image representations. An operator interface 32 comprises a video monitor 34 for converting selected portions of the of the image representations into a human readable display. A keyboard 36 enables the operator to control the image reconstruction process, the selection of images to be displayed, and other relevant parameters.

The instant invention describes a method which is particularly well suited to accounting for negative values contained within data sets such as those generated by scatter correction means 30 or the reconstruction processor 34. Those skilled in the art will recognize that the term pixel, or picture element, is commonly used to denote a data element in a two dimensional data set. Similarly, the term voxel, or volume element, is used to denote a data element in a three dimensional data set. Because the instant invention will be understood to be applicable to data sets of various dimensions, the term cell will be used to denote a data element, regardless of dimensionality.

Figure 3:
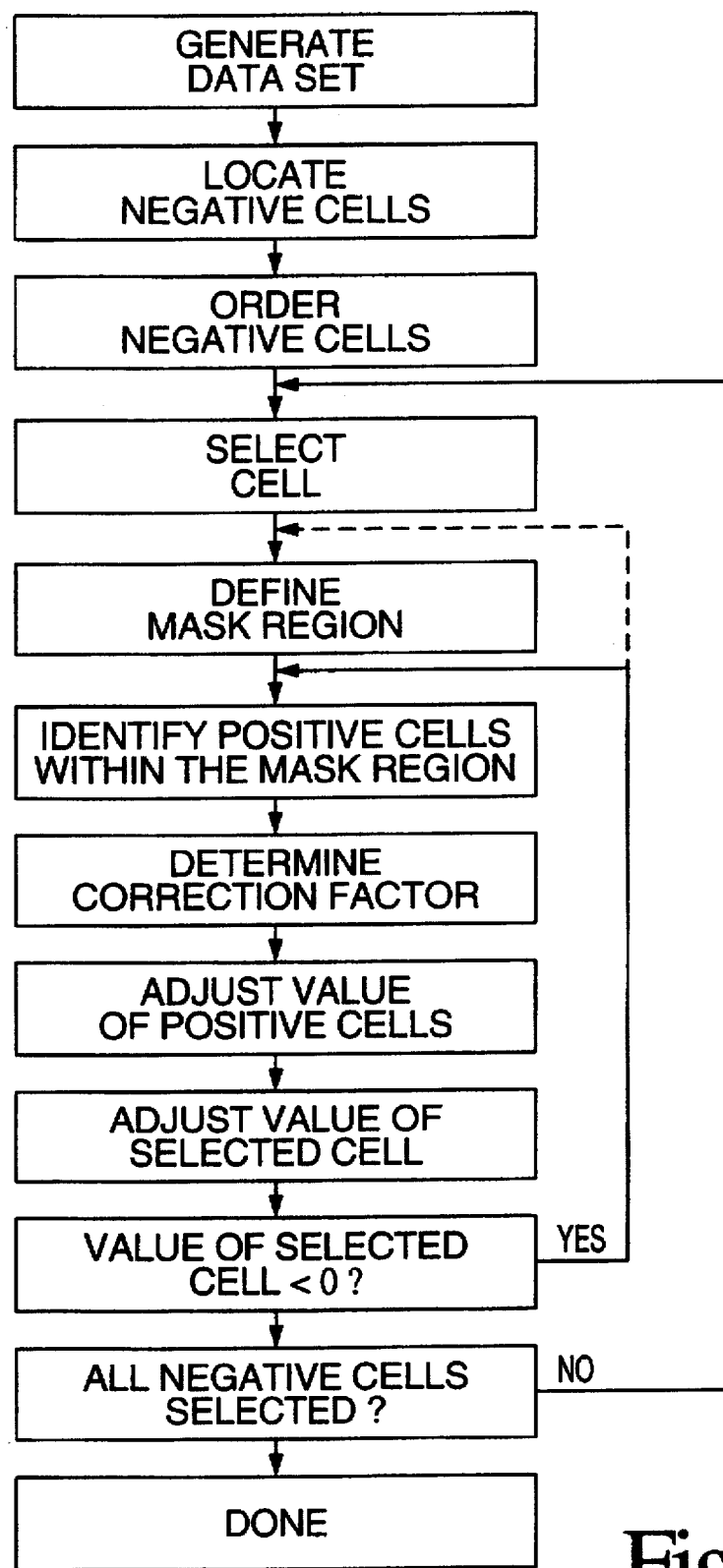
FIG. 3 depicts a method according to the present invention.

With reference to FIG. 3, negative cells contained within the data set are located and ordered for processing. A negative cell is then selected for processing, and a region or mask surrounding the cell is defined. Each positive cell within the mask region is then identified, and a correction factor is calculated for each of the positive cells within the mask region. Each positive cell is adjusted by its respective correction factor. The value of the selected cell is adjusted so that the total number of counts in the mask region (and hence the data set) is unchanged. Thus, the negative count value of the selected cell is distributed among the positive cells within the mask region. If necessary, the process is iterated until all of the negative counts contained within the selected cell are distributed. The process is then repeated until all of the negative cells have been selected.

The negative cells can be ordered for processing according to a number of criteria. One particularly advantageous criterion is to process the cells on a least first basis such that the cells are selected starting with the least negative and working to the most negative.

Other ordering criteria are also contemplated by the invention. For example, the negative cells can be selected (i) randomly; (ii) on a most first basis starting with the most negative and working toward the least negative; and (iii) directionally. When the negative cells are selected directionally, processing commences at a predetermined coordinate in the data set, such as in a corner. The data set is then parsed directionally, for example in a row by row or column by column basis, with negative cells being selected in the order in which they are encountered.

Once a cell has been selected for processing, a mask region is defined with respect to the selected cell. The mask region preferably has the same dimensionality as the data set. Hence, a 2-dimensional mask region is used with a 2-dimensional data set. For two dimensional data sets, such as a data set representative of a slice of the subject, acceptable performance has been achieved by defining the mask region as the 5×5 or 7×7 cell region centered on the selected cell. Larger mask regions permit negative artifacts to be distributed over a larger region but require additional processing due to the greater number of cells within the mask region. Smaller mask regions require less processing due to the lesser number of cells within the mask region but are more likely to result in residual negative values and require iteration. If iteration is necessary, the mask region may optionally be redefined (as indicated by the dashed line in FIG. 3) so that the residual negative value is distributed over a larger area.

Figure 4:
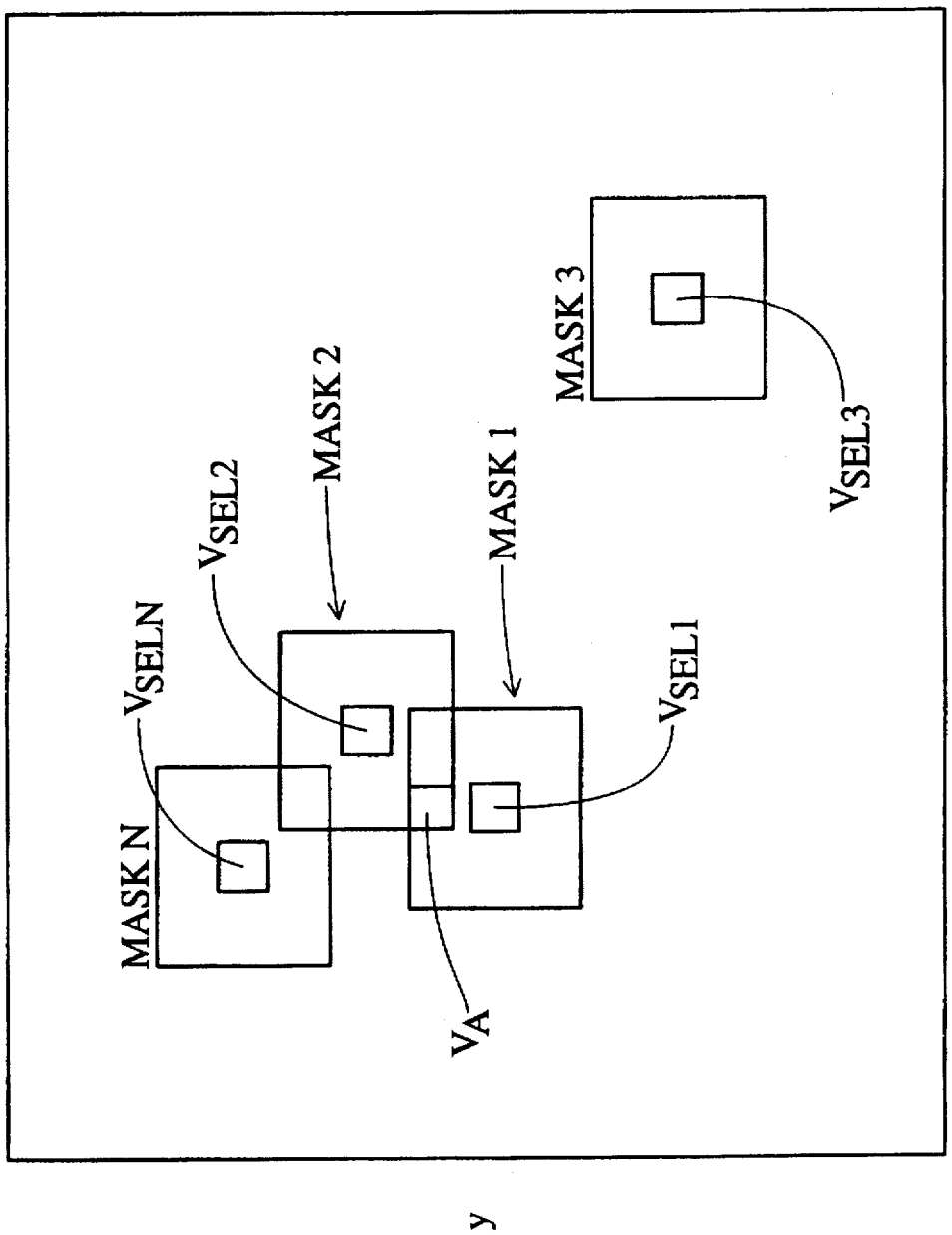
FIG. 4 illustrates the relationship between a plurality of mask regions contained in an arbitrary two dimensional data set.

As illustrated in FIG. 4 and depending on the number and location of the negative cells within the data set and the size of the mask region, the mask regions defined in relation to one or more successively selected negative cells $V_{sel1}$, $V_{sel2}$, $V_{sel3}$, ... $V_{seln}$ may overlap. An arbitrary positive cell $V_a$ within the data set may therefore fall within mask regions defined in relation to more than one negative cell, and the value of the arbitrary cell may be adjusted more than once. In such a case, the value of the cell after the first adjustment is used as the initial value in the subsequent adjustment, and so on.

Various methods can be used to determine correction factors. A particularly advantageous method is on a percentage basis such that cells having a larger positive count value receive a larger portion of the distributed negative value. The correction factor for an arbitrary positive cell within the mask region is thus determined as follows:

$$V_{cf} = \frac{V_a}{\sum_{n=1}^{N} V_n} \times V_{sel} \quad \text{(Eq. 1)}$$

where $V_{cf}$=Correction factor;

$V_a$=Value of the arbitrary cell;

$V_{sel}$=Value of the selected negative cell;

$V_n$=Initial value of positive cell n within the mask region; and

N=Number of positive cells within the mask region.

Other correction factors are also contemplated by the invention. For example, the correction factor can be calculated on a uniform basis such that the negative value is distributed uniformly among the various positive cells within the mask region. The correction factor for an arbitrary positive cell within the mask region is thus determined as follows:

$$V_{cf} = \frac{V_{sel}}{N} \quad \text{(Eq. 2)}$$

The correction factors can be calculated based on the distance from the selected cell to a particular positive cell. The correction factor for an arbitrary positive cell may thus be determined as follows:

$$V_{cf} = \frac{D_a}{\sum_{n=1}^{N} D_n} \times V_{sel} \quad \text{(Eq. 3)}$$

where $D_a$=Distance between the center of the selected cell to the center of the arbitrary positive cell; and $D_n$=Distance between center of positive cell n within the mask region and the center of the selected cell.

The correction factor can be applied randomly among the positive cells. It will also be appreciated that the negative values can also be distributed among negative cells within the mask region.

Once a correction factor for a cell has been determined, the value of the cell is adjusted as follows:

$$V_a' = V_a + V_{cf} \quad \text{(Eq. 4)}$$

where $V_a'$=Adjusted value of the arbitrary cell.

The adjusted value $V_a'$ of a positive cell is preferably constrained to a non-negative value. Thus, if the correction would result in the generation of a new negative cell, the corrected value Va' of the cell is limited to zero. Stated another way, the correction factor for a given cell within the mask region is limited to the value of the cell. The residual negative value is summed with any other residual negative values and the process is then iterated as shown in FIG. 3, with $V_{sel}$ initialized to the sum of the residual negative values. If there are no residual negative values, iteration is not necessary.

Figure 5:
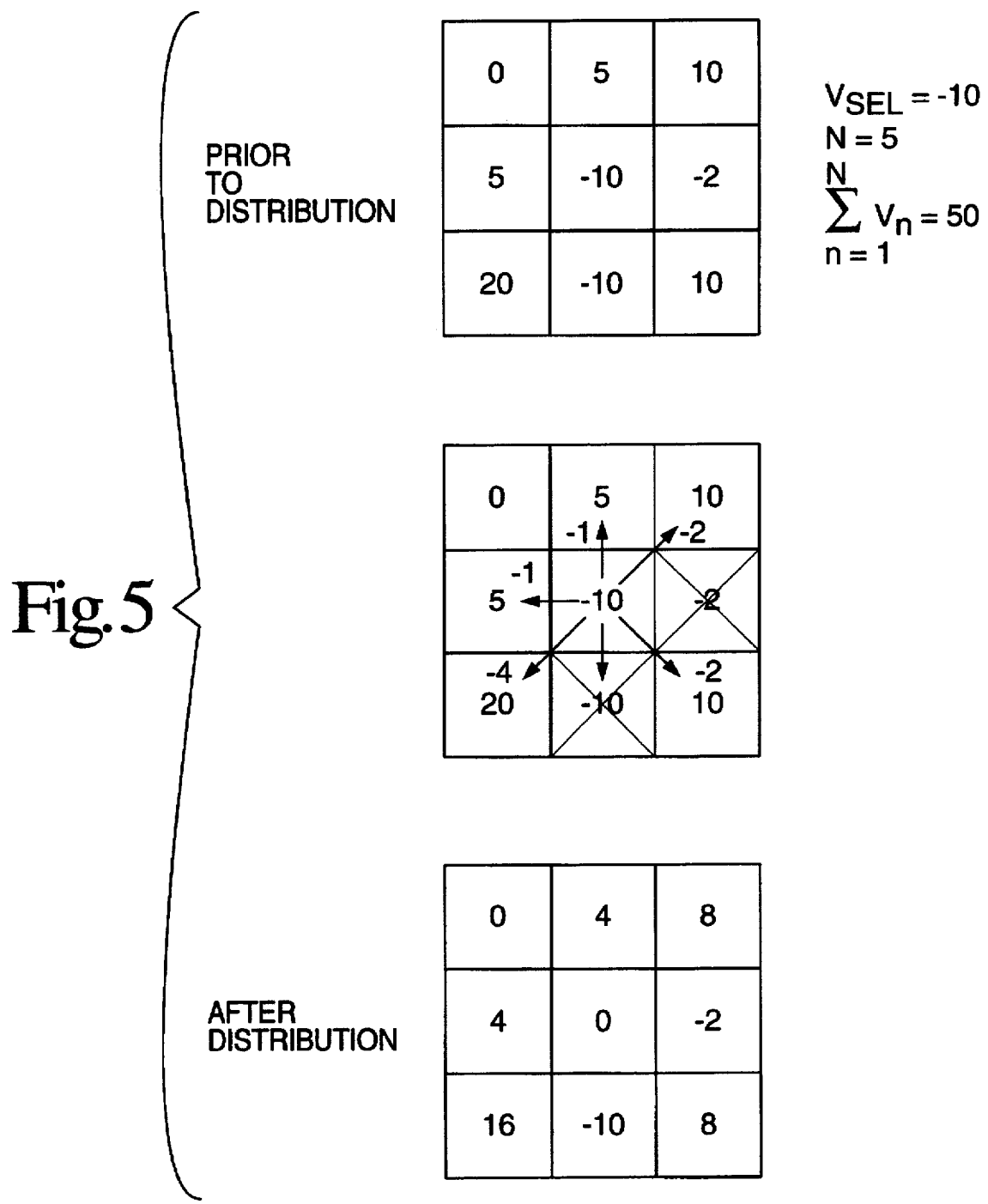
FIG. 5 depicts an arbitrary cell and mask region before and after correction on a percentage basis according to the present invention.

An example of a selected cell and arbitrary mask for a two dimensional data set and 3×3 mask both before and after distribution on a percentage basis is shown in FIG. 5. The mask or region comprises the 8 cells adjacent the selected cell. Prior to distribution, the selected cell and mask region can be characterized as follows:

$$V_{sel} = -10 \quad N = 5 \quad \sum_{n=1}^{5} V_n = 50$$

After distribution, the negative value contained in the selected cell has been distributed among the non-negative cells within the mask. Hence, the value of the selected cell becomes zero while the total number of counts within the mask region is unchanged at 28. Thus, the negative bias inherent in prior art truncation and biasing techniques is eliminated without edge degradation caused by filtering techniques.

An example of an arbitrary two dimensional data set and mask both before and after distribution on a uniform basis is shown in FIG. 6. Prior to distribution, the selected cell and mask region can be characterized as follows:

$$V_{sel} = -15 \quad N = 5 \quad \frac{V_{sel}}{N} = -3$$

During the first distribution, correction of three cells in the left column by the correction factor would have generated negative cells. Each of the cells was adjusted to zero, and the residual, undistributed negative values were summed. $V_{sel}$ is initialized to the total residual negative value, and the process is distribution process is iterated. After the first distribution and prior to the iteration, the selected cell and mask region can be characterized as follows:

$$V_{sel} = -5 \quad N = 2 \quad \frac{V_{sel}}{N} = -2.5$$

After distribution, the negative value contained in the selected cell has been distributed among the non-negative cells within the mask. Hence, the value of the selected cell becomes zero while the total number of counts within the mask region is unchanged at 7.

With respect to FIG. 2, it will be appreciated that the invention has been described as operating on data sets which have been previously reconstructed and scatter corrected. The invention can be applied to remove negativity artifacts in data sets where scatter correction is performed prior to reconstruction. Similarly, the invention can be used to remove negativity artifacts created by filtered back projection techniques.

Those skilled in the art will appreciate that the instant invention is not limited to two dimensional data sets and that the invention is easily adapted to sets having other dimensions, including one and three dimensional sets. It will also be appreciated that the invention is not limited to three-headed gamma cameras and is also applicable, for example, to single and two-headed units. The invention is equally applicable to other imaging modalities, such as computerized tomogaphy ("CT"). As is well known in the art, a source of x-radiation is rotated about an object being imaged, and a data set indicative of the radiation absorbed along a plurality of generally radial paths through the object is generated. This data is then reconstructed using known back projection techniques to generate one or more image representations of the object. The present invention is particularly well suited to removing negativity artifacts in the reconstructed data set.

The invention has been described with reference to the preferred embodiments. Obviously, modifications and alterations wills occur to others upon reading and understanding preceding detailed description. It is intended that the invention be construed as including all such modifications and alterations insofar as they come within the scope of the appended claims or the equivalents thereof.

What is claimed is:

1. A method of generating an image comprising the steps of:

detecting radiation indicative of an object being imaged;
  generating a data set indicative of the detected radiation;
  selecting a negative cell within the data set;
  defining a mask region with relation to the selected cell;
  adjusting the value of each positive cell within the mask region;
  adjusting the value of the selected cell; and
  generating an image indicative of the object.

2. The method of claim 1 wherein the value of the selected cell is adjusted so that the sum of the values of the selected cell and the cells within the mask region remains constant.

3. The method of claim 2 further comprising the step of repeating the steps of adjusting the value of each positive cell and adjusting the value of the selected cell until the selected cell is no longer negative.

4. The method of claim 3 further comprising the step of repeating the step of defining a mask region.

5. The method of claim 1 further comprising the step of repeating the steps of selecting, defining, adjusting the value of each positive cell, and adjusting the value of the selected cell, the negative cells being selected in a desired order.

6. The method of claim 5 wherein the order is least first.

7. The method of claim 1 wherein the positive cells are adjusted on a uniform basis.

8. The method of claim 1 wherein the positive cells are adjusted on a percentage basis.

9. The method of claim 1 wherein the radiation is gamma radiation.

10. A method of generating an image comprising the steps of:

detecting radiation indicative of an object;
  generating a data set indicative of the detected radiation;
  selecting a cell within the data set;
  defining a mask region with relation to the selected cell;
  adjusting the value of at least one of the cells within the mask region;
  adjusting the value of the selected cell;
  repeating the steps of adjusting the value of at least one of the cells and adjusting the value of the selected cell until the selected cell reaches a desired value; and
  generating an image indicative of the object.

11. The method of claim 10 wherein the selected cell is adjusted so that the sum of the values of the selected cells and the cells within the mask region remains constant.

12. The method of claim 10 wherein the initial value of the selected cell is less than zero and the desired value is zero.

13. The method of claim 10 wherein the step of repeating further comprises repeating the step of defining a mask region.

14. The method of claim 10 further comprising the step of repeating the steps of selecting, defining, adjusting at least one, adjusting the selected cell, and repeating, the cells within the data set being selected in a desired order.

15. The method of claim 10 wherein the at least one of the cells in the mask region are adjusted on a distance basis.

16. The method of claim 10 wherein the radiation is x-radiation.

17. A method of generating an image comprising the steps of:

detecting radiation indicative of an object being imaged;
  generating a data set indicative of the detected radiation;
  selecting a cell within the data set having a value which satisfies a first criterion;
  distributing at least a portion of the value of the selected cell among cells in a region determined in relation to the selected cell, said cells each having a value which satisfies a second criterion; and
  generating an image of the object.

18. The method of claim 17 further comprising the step of repeating the steps of selecting and distributing until all cells having a value which satisfies the first criterion have been selected.

19. The method of claim 18 wherein the cells are selected in random order.

20. The method of claim 17 wherein the step of distributing further comprises the steps of:

defining a mask region in relation to the selected cell;

adjusting the value of cells within the mask region which satisfy the second criterion; and adjusting the value of the selected cell so that the sum of the values of the selected cell and the adjusted cells remains constant;

wherein the steps of defining and distributing are repeated until the value of the selected cell satisfies a third criterion.

21. The method of claim 20 wherein the second criterion is a value greater than a threshold value and the third criterion is a value equal to the threshold value.

22. The method of claim 17 wherein the first criterion is a value less than a threshold and the second criterion is a value greater than the threshold.

23. The method of claim 17 wherein the at least a portion of the value of the selected cell is distributed on a percentage basis.

24. A method of generating an image comprising the steps of:

detecting radiation indicative of an object being imaged;

generating a data set indicative of the detected radiation;

selecting a cell within the data set;

identifying cells within a region defined in relation to the selected cell, the identified cells having a value which satisfies a criterion;

determining a correction factor for each of the identified cells;

adjusting the value of each of the identified cells by its respective correction factor;

adjusting the value of the selected cell; and generating an image indicative of the object.

25. The method of claim 24 wherein the correction factor is determined on a percentage basis.

26. The method of claim 21 wherein the criterion is a value less than a threshold and the adjusted value of the identified cells is limited to the threshold.

* * * * *